United States Patent
Tajima et al.

(10) Patent No.: US 6,422,351 B2
(45) Date of Patent: Jul. 23, 2002

(54) ELEVATOR SPEED CONTROLLER RESPONSIVE TO DUAL ELECTRICAL POWER SOURCES

(75) Inventors: Shinobu Tajima; Hiroshi Araki; Ikuro Suga; Kazuyuki Kobayashi, all of Tokyo (JP)

(73) Assignees: Mitsubishi Denki Kabushiki Kaisha; The Tokyo Electric Power Company, Incorporated, both of Tokyo (JP)

( * ) Notice: Subject to any disclaimer, the term of this patent is extended or adjusted under 35 U.S.C. 154(b) by 0 days.

(21) Appl. No.: 09/785,465

(22) Filed: Feb. 20, 2001

(30) Foreign Application Priority Data

Feb. 28, 2000 (JP) ........................................ 2000-052346

(51) Int. Cl.$^7$ ................................................ B66B 1/06
(52) U.S. Cl. ........................................ 187/290; 318/801
(58) Field of Search ........................ 187/290, 296, 187/297, 247; 318/375, 376, 758–816; 307/64, 66

(56) References Cited

U.S. PATENT DOCUMENTS

| | | | | |
|---|---|---|---|---|
| 3,935,518 A | * | 1/1976 | Yatsuk et al. | 318/227 |
| 4,484,664 A | * | 11/1984 | Nomura | 187/29 R |
| 4,506,766 A | * | 3/1985 | Watanabe | 187/29 R |
| 4,666,020 A | * | 5/1987 | Watanabe | 187/114 |
| 5,285,029 A | * | 2/1994 | Araki | 187/114 |
| 5,629,598 A | * | 5/1997 | Wilkerson | 318/808 |
| 5,698,823 A | * | 12/1997 | Tanahashi | 187/296 |
| 6,264,005 B1 | * | 7/2001 | Kang et al. | 187/290 |
| 6,315,081 B1 | * | 11/2001 | Yeo | 187/290 |

FOREIGN PATENT DOCUMENTS

JP 10-67469 3/1998

* cited by examiner

*Primary Examiner*—Jonathan Salata
(74) *Attorney, Agent, or Firm*—Leydig, Voit & Mayer, Ltd.

(57) ABSTRACT

An elevator controller providing stable speed control using a cheap power accumulating device having a low capacity even in discharging. The controller has a converter, an inverter, a power accumulating device arranged between DC buses, a charging-discharging control circuit for controlling charging and discharging of the power accumulating device, a power failure detector, a current measuring instrument and a voltage measuring instrument for respectively detecting an output current and an output voltage of the inverter, a car load measuring instrument, an encoder, and a speed control circuit for controlling the inverter. The speed control circuit calculates output power of the inverter, and calculates discharging power of the power accumulating device on the basis of a measured value of charging and discharging states. The speed control circuit calculates a maximum power as a sum of the discharging ability power and power of an AC power source, and changes speed commands on the basis of comparison of the output power of the inverter and the maximum power.

7 Claims, 12 Drawing Sheets

FIG. 3

| PRESENT DISCHARGING CURRENT | DISCHARGING VOLTAGE | LIMITED DISCHARGING CURRENT |
|---|---|---|
| A1 AMPERE | V11 VOLT | — |
| | V12 VOLT | A11 AMPERE |
| | V13 VOLT | A13 AMPERE |
| | | |
| | | |
| | | |
| | | |
| | | |
| | | |

T1

| CHARGING DEGREE (SOC) | LIMITED DISCHARGING CURRENT |
|---|---|
| | |
| | |
| | |
| | |

FIG. 10

| TIMER INTERRUPTION NUMBER | COMMAND SPEED |
|---|---|
| 1 | v1 |
| 2 | v2 |
| 3 | v3 |
|  |  |
|  |  |
|  |  |
|  |  |
| HIGHEST SPEED | vmax |

FIG. 11

| REMAINING DISTANCE | COMMAND SPEED |
|---|---|
| d1 | vd1 |
| d2 | vd2 |
|  |  |

ELEVATOR SPEED CONTROLLER RESPONSIVE TO DUAL ELECTRICAL POWER SOURCES

BACKGROUND OF THE INVENTION

1. Field of the Invention

This invention relates to a controller of an elevator of an energy saving type to which a secondary battery is applied.

2. Description of the Related Art

FIG. 13 is a view showing the basic construction of a controller for controlling the operation of an elevator by applying a conventional secondary battery thereto.

In FIG. 13, reference numerals 1 and 2 respectively designate a three-phase AC power source and a converter constructed by a diode, etc. and converting AC power outputted from the three-phase AC power source 1 to DC power. The DC power converted by the converter 2 is supplied to a DC bus 3. The operation of an inverter 4 is controlled by a speed controller for controlling a speed position of the elevator and described later. A direct current supplied through the DC bus 3 is converted to an alternating current of predetermined desirable variable voltage and variable frequency and an AC motor 5 is driven so that a hoisting machine 6 of the elevator directly connected to the AC motor 5 is rotated. Thus, a rope 7 wound around the hoisting machine 6 controls elevating and lowering operations of a car 8 and a counterweight 9 connected to both ends of this rope 7 and passengers within the car 8 are moved to a predetermined stage floor.

Here, weights of the car 8 and the counterweight 9 are designed such that these weights are approximately equal to each other when passengers half a number limit ride in the car 8. Namely, when the car 8 is elevated and lowered with no load, a power running operation is performed at a lowering time of the car 8 and a regenerative operation is performed at a elevating time of the car 8. Conversely, when the car 8 is lowered in the number limit riding, the regenerative operation is performed at the lowering time of the car 8 and the power running operation is performed at the elevating time of the car 8.

An elevator control circuit 10 is constructed by a microcomputer, etc., and manages and controls an entire operation of the elevator. A power accumulating device 11 is arranged between DC buses 3 and accumulates power at the regenerative operation time of the elevator, and supplies the accumulated power to the inverter 4 together with the converter 2 at the power running operation time. The power accumulating device 11 is constructed by a secondary battery 12 and a DC—DC converter 13 for controlling charging and discharging operations of this secondary battery 12.

Here, the DC—DC converter 13 has a voltage lowering type chopper circuit and a voltage raising type chopper circuit. The voltage lowering type chopper circuit is constructed by a reactor 13a, a gate 13b for charging current control connected in series to this reactor 13a, and a diode 13c connected in reverse parallel to a gate 13d for discharging current control described later. The voltage raising type chopper circuit is constructed by the reactor 13a, the gate 13d for discharging current control connected in series to this reactor 13a, and a diode 13e connected in reverse parallel to the above gate 13b for charging current control. Operations of the gate 13b for charging current control and the gate 13d for discharging current control are controlled by a charging-discharging control circuit 15 on the basis of a measuring value from a charging-discharging state measuring device 14 for measuring charging and discharging states of the power accumulating device 11 and a measuring value from a voltage measuring instrument 18. A current measuring instrument arranged between the secondary battery 12 and the DC—DC converter 13 is used as the charging-discharging state measuring device 14 in this conventional example.

A gate 16 for regenerative current control and a regenerative resistor 17 are arranged between DC buses 3. The voltage measuring instrument 18 measures the voltage of a DC bus 3. A regenerative control circuit 19 is operated on the basis of regenerative control commands from a speed control circuit described later. The gate 16 for regenerative current control is constructed such that an ON pulse width is controlled on the basis of control of the regenerative control circuit 19 when a measuring voltage provided by the voltage measuring instrument 17 is equal to or greater than a predetermined value at the regenerative operation time. Regenerated power is discharged in the regenerative resistor 17 and is converted to thermal energy and is consumed.

An encoder 20 is directly connected to the hoisting machine 6. The speed control circuit 21 controls a position and a speed of the elevator by controlling an output voltage and an output frequency of the inverter 4 on the basis of speed commands and a speed feedback output from the encoder 22 based on commands from the elevator control circuit 10.

An operation of the controller having the above construction will next be explained.

At a power running operation time of the elevator, power is supplied to the inverter 4 from both the three-phase AC power source 1 and the power accumulating device 11. The power accumulating device 11 is constructed by the secondary battery 12 and the DC—DC converter 13, and an operation of this power accumulating device 11 is controlled by the charging-discharging control circuit 15. In general, the number of secondary batteries 12 is reduced as much as possible and an output voltage of each secondary battery 12 is lower than the voltage of the DC bus 3 so as to make the controller compact and cheaply construct the controller. The voltage of the DC bus 3 is basically controlled near a voltage provided by rectifying a three-phase AC of the three-phase AC power source 1. Accordingly, it is necessary to lower the bus voltage of the DC bus 3 at a charging time of the secondary battery 12 and raise the bus voltage of the DC bus 3 at a discharging time of the secondary battery 12. Therefore, the DC—DC converter 13 is adopted. Operations of the gate 13b for charging current control and the gate 13d for discharging current control in this DC—DC converter 13 are controlled by the charging-discharging control circuit 15.

FIGS. 14 and 15 are flow charts showing controls of the charging-discharging control circuit 15 at its discharging and charging times.

The control of the charging-discharging control circuit 15 at the discharging time shown in FIG. 14 will first be explained.

A current control minor loop, etc. are constructed in voltage control of a control system and the control operation may be more stably performed. However, for simplicity, the control of the charging-discharging control circuit 15 is here explained by a control system using the bus voltage.

First, the bus voltage of the DC bus 3 is measured by the voltage measuring instrument 17 (step S11). The charging-discharging control circuit 15 compares this measuring voltage with a predetermined desirable voltage set value and judges whether the measuring voltage exceeds the voltage set value or not (step S12). If no measuring voltage exceeds the set value, the charging-discharging control circuit 15 next judges whether the measuring value of a discharging current of the secondary battery 12 provided by the charging-discharging state measuring device 14 exceeds a predetermined value or not (step S13).

When the measuring voltage exceeds the set value by these judgments, or when the measuring value of the discharging current of the secondary battery 12 exceeds the predetermined value even if no measuring voltage exceeds the set value, an adjusting time DT is subtracted from the present ON time to shorten an ON pulse width of the gate 13d for discharging current control and a new gate ON time is calculated (step S14).

In contrast to this, when it is judged in the above step S13 that no measuring value of the discharging current of the secondary battery 12 provided by the measuring device 14 exceeds the predetermined value, a new gate ON time is calculated by adding the adjusting time DT to the present ON time so as to lengthen the ON pulse width of the gate 13d for discharging current control (step S15). Thus, ON control of the gate 13d for discharging current control is performed on the basis of the calculated gate ON time, and the calculated gate ON time is stored to a built-in memory as the present ON time (step S16).

Thus, more electric current flows from the secondary battery 12 by lengthening the ON pulse width of the gate 13d for discharging current control. As a result, supply power is increased and the bus voltage of the DC bus 3 is increased by the power supply. When the power running operation is considered, the elevator requires the power supply and this power is supplied by discharging the secondary battery 12 and by power supply from the three-phase AC power source 1. When the bus voltage is controlled such that this bus voltage is higher than an output voltage of the converter 2 supplied from the three-phase AC power source 1, all power is supplied from the secondary battery 12. However, the controller is designed so that all power is not supplied from the secondary battery 12, but is supplied from the secondary battery 12 and the three-phase AC power source 1 in a suitable ratio so as to cheaply construct the power accumulating device 11.

Namely, in FIG. 14, the measuring value of the discharging current is compared with a supply allotment corresponding current (predetermined value). If this measuring value exceeds the predetermined value, the ON pulse width of the gate 13d for discharging current control is lengthened and a supply amount is further increased. In contrast to this, when no measuring value of the discharging current exceeds the predetermined value, the ON pulse width of the gate 13d for discharging current control is shortened and the power supply is clipped. Thus, since power supplied from the secondary battery 12 is clipped among power required in the inverter 4, the bus voltage of the DC bus 3 is reduced so that the power supply from the converter 2 is started. These operations are performed for a very short time so that a suitable bus voltage is actually obtained to supply required power of the elevator. Thus, power can be supplied from the secondary battery 12 and the three-phase AC power source 1 in a predetermined desirable ratio.

The control of the charging-discharging control circuit 15 at the charging time shown in FIG. 15 will next be explained.

When there is power regeneration from the AC motor 5, the bus voltage of the DC bus 3 is increased by this regenerated power. When this voltage is higher than an output voltage of the converter 2, the power supply from the three-phase AC power source 1 is stopped. When there is no power accumulating device 11 and this stopping state is continued, the voltage of the DC bus 3 is increased. Therefore, when a measuring voltage value of the voltage measuring instrument 17 for detecting the bus voltage of the DC bus 3 reaches a certain predetermined voltage, the regenerative control circuit 19 is operated and closes the gate 16 for regenerative current control. Thus, power flows through the regenerative resistor 17 and the regenerated power is consumed and the elevator is decelerated by electromagnetic braking effects. However, when there is the power accumulating device 11, this power is charged to the power accumulating device 11 by the control of the charging-discharging control circuit 15 with a voltage equal to or smaller than a predetermined voltage.

Namely, as shown in FIG. 15, if the measuring value of the bus voltage of the DC bus 3 provided by the voltage measuring instrument 17 exceeds the predetermined voltage, the charging-discharging control circuit 15 detects that it is a regenerative state, and increases a charging current to the secondary battery 12 by lengthening the ON pulse width of the gate 13b for charging current control (step S21→S22→S23). When the regenerated power from the elevator is reduced in a short time, the voltage of the DC bus 3 is also correspondingly reduced and no measuring value of the voltage measuring instrument 17 exceeds the predetermined voltage. Accordingly, the ON pulse width of the gate 13b for charging current control is shortly controlled and charging power is also reduced and controlled (step S21→S22→S24).

Thus, the bus voltage is controlled in a suitable range and a charging operation is performed by monitoring the bus voltage of the DC bus 3 and controlling the charging power. Further, energy is saved by accumulating and re-utilizing power conventionally consumed in the regenerated power. When no power of a charger is consumed for certain reasons such as a breakdown, etc., the above regenerative control circuit 19 is operated as a backup and the regenerated power is consumed by a resistor so that the elevator is suitably decelerated. In a general elevator for housing, the regenerated power is about 2 KVA and is about 4 KVA at its maximum decelerating value although this regenerated power is different in accordance with a capacity of the elevator, etc.

The regenerative control circuit 19 monitors the voltage of the DC bus 3. If this voltage is equal to or greater than a predetermined value, the ON pulse width of the gate 16 for regenerative current control is controlled by the regenerative control circuit 19 so as to discharge the above power in the regenerative resistor 17 so that the regenerated power flows through the regenerative resistor 17. There are various kinds of systems for controlling this pulse width, but the pulse width is simply controlled in accordance with the following formula. Namely, when the voltage of the DC bus 3 for starting turning-on of the gate 16 for regenerative current control is set to VR, a flowing current IR can be simply calculated by turning-on (closing) a circuit since a resistance value of the regenerative resistor 17 is already known. Further, maximum power to be flowed is already known. Therefore, if this maximum power (VA) is set to WR, it is sufficient to generate an ON pulse of duty of WR/(VR×IR) while the DC bus voltage is monitored. However, an object of this construction is to consume all regenerated power in the regenerative resistor 17.

However, in the above conventional controller of the elevator, it is necessary to stack the secondary battery 12 to produce a large capacity able to be charged by the regenerated power in the power accumulating device 11 for all conditions in which temperature and charging degree of the power accumulating device 11, i.e., a fully charged state of the power accumulating device 11, are set to reference values, and a product of a charging-discharging current and a charging-discharging voltage is normalized and accumulated, and a SOC (State Of Charge) is obtained as this normalized and accumulated value, etc. Therefore, an expensive and large-sized power accumulating device 11 is required.

SUMMARY OF THE INVENTION

To solve the above problems, an object of this invention is to provide a controller of an elevator capable of performing stable speed control by using a cheap power accumulating device of a low capacity even at a discharging control time.

To achieve this object, a controller of an elevator in this invention comprises a converter for rectifying AC power from an AC power source and converting the AC power to DC power; an inverter for converting the DC power outputted from the converter to AC power of a variable voltage and a variable frequency and driving an electric motor and operating the elevator; a power accumulating device arranged between DC buses between the converter and the inverter, and accumulating DC power from the DC buses at a regenerative operation time of the elevator, and supplying the accumulated DC power to the DC buses at a power running operation time; a charging-discharging control device for controlling charging and discharging operations of the power accumulating device with respect to the DC buses; charging-discharging state measuring means for measuring at least one of a temperature, charging and discharging currents, and charging and discharging voltages of the power accumulating device; current detecting means for detecting an output current of the inverter; voltage detecting means for detecting an output voltage of the inverter; speed detecting means for detecting a speed of the elevator; and speed control means for controlling an operation of the inverter to perform speed control based on speed commands of the elevator and a detecting value from the speed detecting means; the controller being characterized in that the speed control means calculates output power of the inverter on the basis of a detected current value of the current detecting means and a detected voltage value of the voltage detecting means, and calculates discharging ability power of the power accumulating device on the basis of a measuring value of the charging-discharging state measuring means, and calculates a limited power maximum value given by a sum of the discharging ability power and limited power of the AC power source, and changes speed commands on the basis of comparison of the output power of the inverter and the limited power maximum value.

Further, the speed control means has a table set with a limited discharging current with respect to a discharging current and a discharging voltage, and calculates the limited discharging current from the table on the basis of measuring values of the discharging current and the discharging voltage from the charging-discharging state measuring means, and calculates the discharging ability power of the power accumulating device from the calculated limited discharging current and the measuring value of the discharging voltage.

Further, the speed control means has a table set with a limited discharging current with respect to a charging degree as a value obtained by normalizing and accumulating a product of a charging-discharging current and a charging-discharging voltage by a capacity with a full charging state of the power accumulating device as 100%, and the limited discharging current is calculated from the table on the basis of the charging degree obtained on the basis of measuring values of the discharging current and the discharging voltage from the charging-discharging state measuring means, and the discharging ability power of the power accumulating device is calculated from the calculated limited discharging current and the measuring value of the discharging voltage.

Further, the speed control means has plural tables according to the temperature of the power accumulating device, and selects a table according to a temperature measuring value provided by the charging-discharging state measuring means.

Further, the speed control means has a table setting a speed pattern according to a load state, and calculates the speed pattern from the table on the basis of a car load measuring value measured by car load measuring means and generates speed commands according to the calculated speed pattern when it is judged on the basis of a measuring value provided by the charging-discharging state measuring means that the power accumulating device is broken.

Further, the speed control means has a table set with a maximum speed command value with respect to a car load and the discharging ability power of the power accumulating device, and calculates the discharging ability power of the power accumulating device on the basis of a measuring value of the charging-discharging state measuring means, and calculates maximum speed commands from the table on the basis of a car load measuring value measured by car load measuring means and the calculated discharging ability power, and changes speed commands on the basis of comparison of the speed commands and the maximum speed commands.

Further, the speed control means has plural speed pattern tables corresponding to the car load and the discharging ability power of the power accumulating device, and calculates the discharging ability power of the power accumulating device on the basis of the measuring value of the charging-discharging state measuring means, and selects the tables on the basis of the car load measuring value measured by the car load measuring means, and performs speed control according to a selected speed pattern.

BRIEF DESCRIPTION OF THE DRAWINGS

FIG. 3 is an explanatory view of a table in a speed control circuit in an Embodiment 1 of this invention in which a limit discharging current is set with respect to a discharging current and a discharging voltage.

FIG. 10 is an explanatory view of a table in a speed control circuit in an Embodiment 6 of this invention in which a command speed is selected in accordance with discharging ability and a measured load and is set in accordance with the number of timer interruption times.

FIG. 11 is an explanatory view of a table in the speed control circuit in the Embodiment 6 of this invention in which a command speed according to the remaining distance is set.

DESCRIPTION OF THE PREFERRED EMBODIMENTS

In this invention, the speed of an elevator is controlled on the basis of discharging ability power of a power accumulating device, and the elevator having the power accumulating device of a long battery life is provided.

Figure 1:
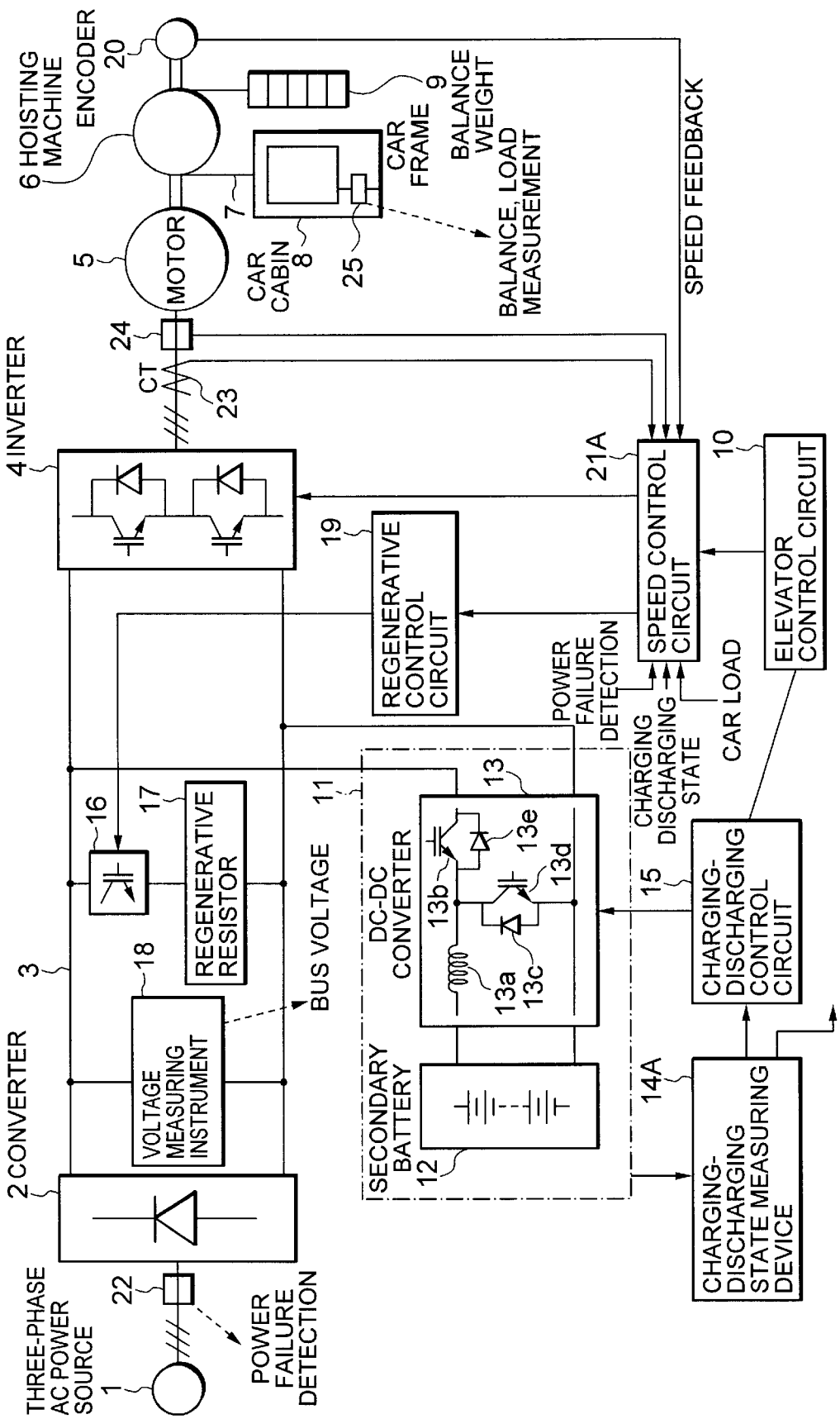
FIG. 1 is a block diagram showing the construction of a controller of an elevator in this invention.
Figure 13:
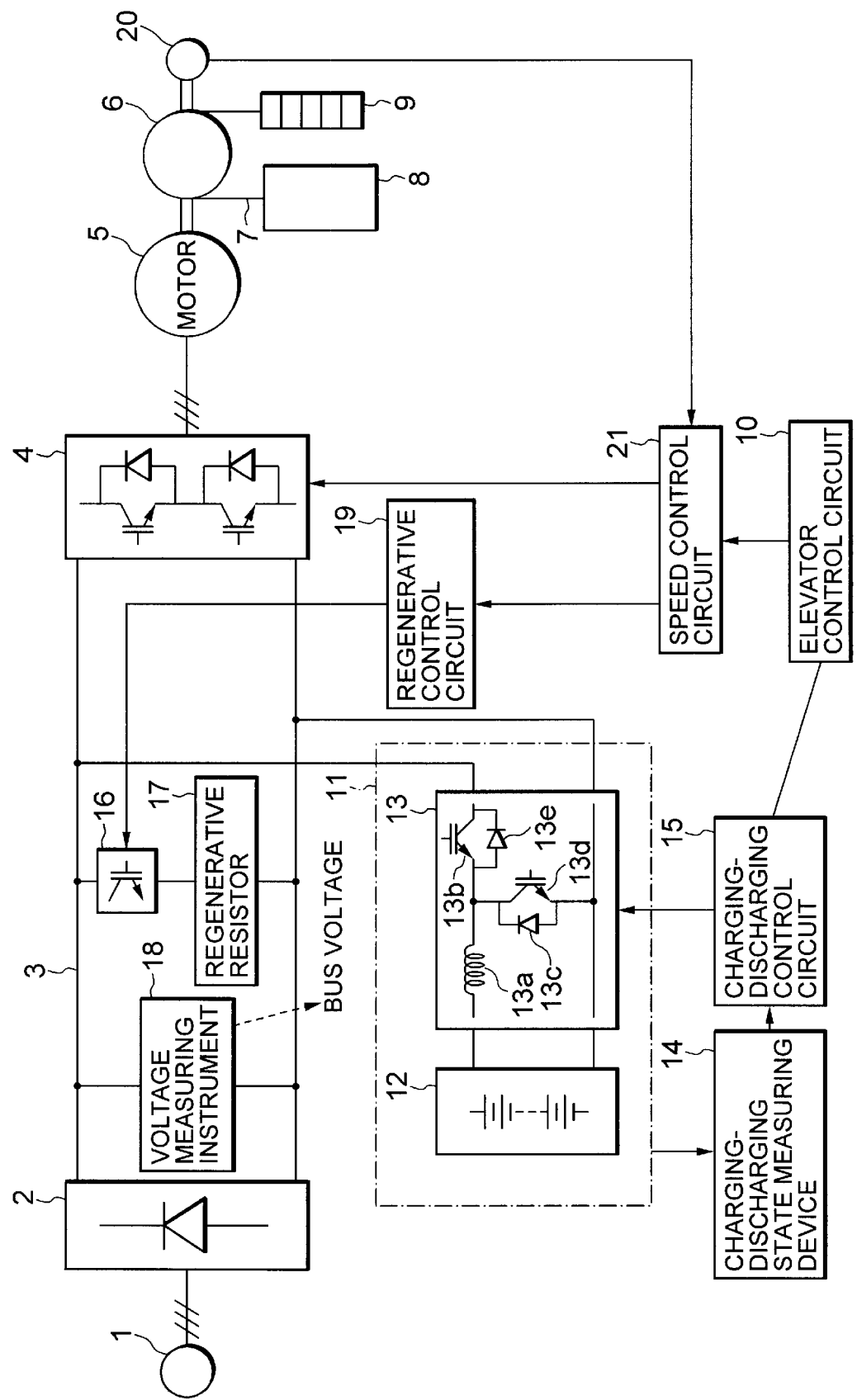
FIG. 13 is a block diagram showing the construction of a controller of an elevator in a conventional example.
Figure 14:
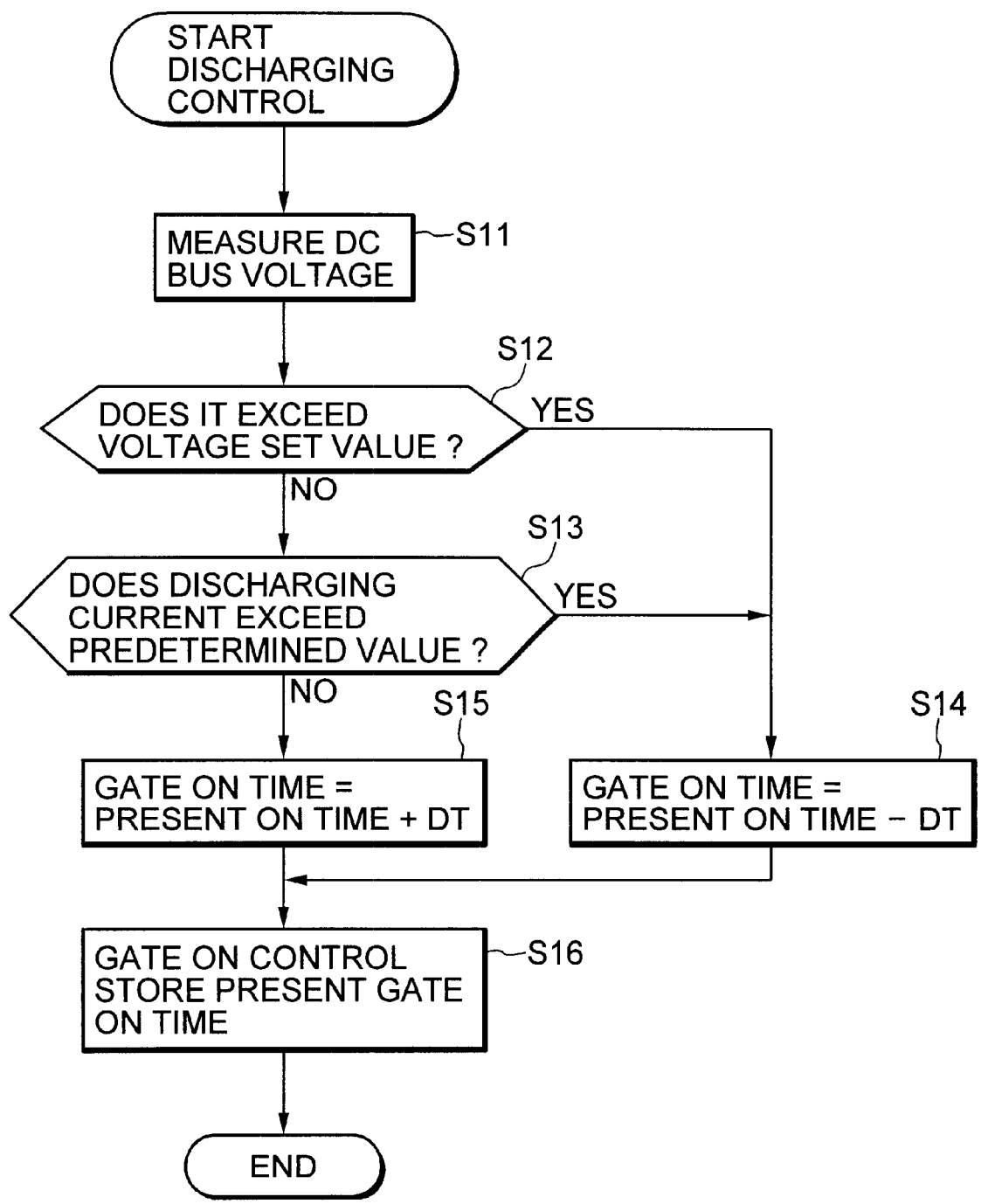
FIG. 14 is a flow chart showing the control of a charging-discharging control circuit 15 shown in FIG. 13 during discharging.
Figure 15:
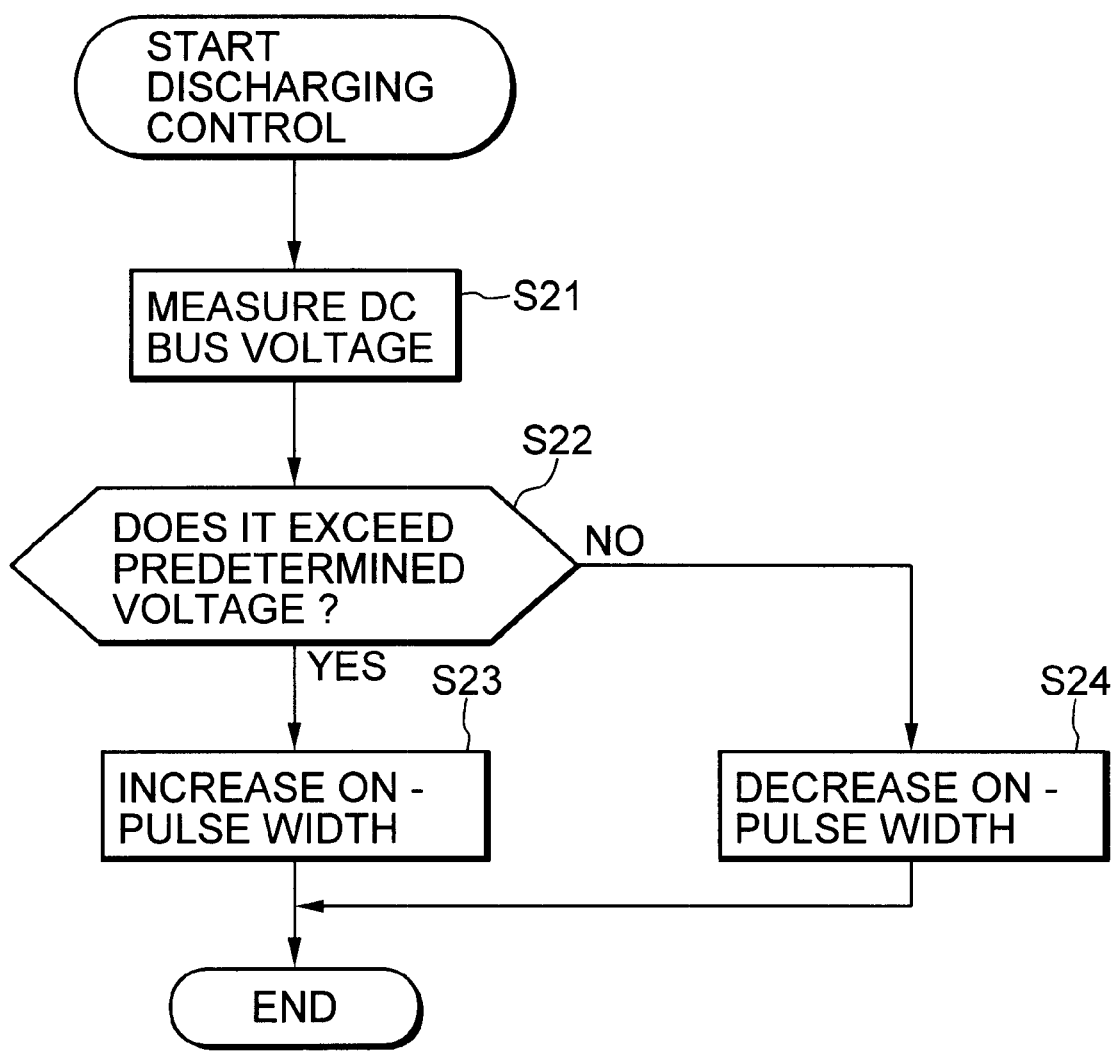
FIG. 15 is a flow chart showing the control of the charging-discharging control circuit 15 shown in FIG. 13 during charging.

FIG. 1 is a block diagram showing the construction of a controller of the elevator in this invention. In FIG. 1, the same portions as the conventional example shown in FIG. 13 are designated by the same reference numerals and their explanations are omitted here. New reference numerals 14A and 21A respectively designate a charging-discharging state measuring device and a speed control circuit in the present invention. A power failure detector 22 detects a power failure of a three-phase AC power source 1. A current measuring instrument 23 and a voltage measuring instrument 24 respectively measure an output current and an output voltage of an inverter 4. A car load measuring instrument 25 is arranged between the cabin of a car 8 and a bottom portion of a car frame and measures a car load. The charging-discharging state measuring device 14A has each of measuring instruments for measuring charging and discharging currents, charging and discharging voltages and a temperature of a power accumulating device 11. In the charging-discharging state measuring device 14A, each of these measuring values and a charging degree, i.e., a full charging state of the power accumulating device 11 is set to 100%, and a SOC (State Of Charge) as a value obtained by normalizing and accumulating a product of a charging-discharging current and a charging-discharging voltage by a capacity is outputted to the speed control circuit 21A. The speed control circuit 21A outputs speed commands for controlling a speed of the elevator to the inverter 4 in a range of discharging ability power of the power accumulating device 11 at a detecting time of the power failure during running of the elevator on the basis of a power failure detecting signal from the power failure detector 22 or the voltage measuring instrument 18, charging and discharging states from the charging-discharging state measuring device 14A, a speed feedback signal from an encoder 20, each of measuring values from the current measuring instrument 22 and the voltage measuring instrument 23, and a car load measuring value from a car load measuring instrument.

Figure 2:
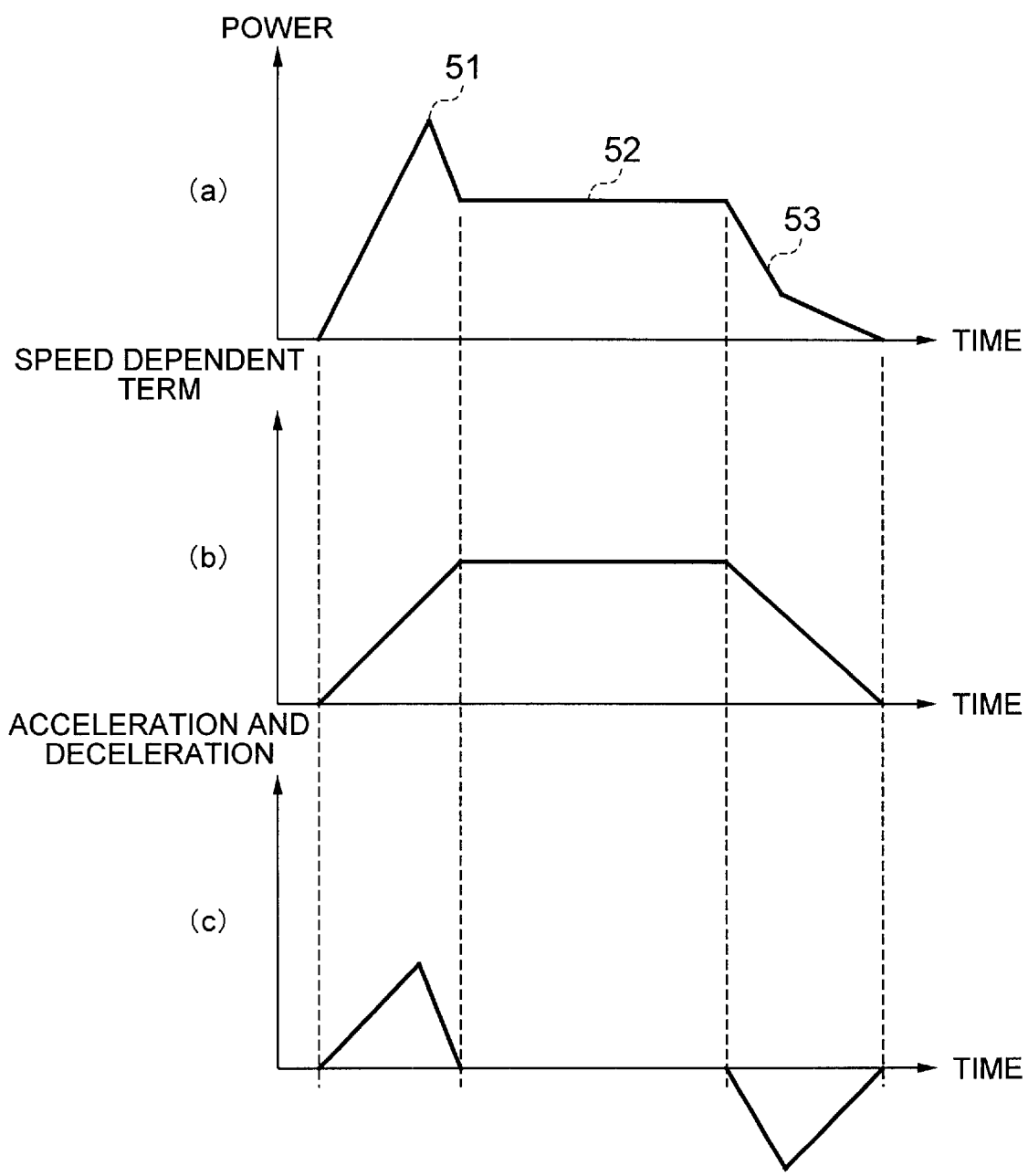
FIG. 2 is a view used to explain speed control of the elevator at a power failure time in this invention and showing a power waveform at a power running operation time of the elevator with a time axis as an axis of abscissa.

FIG. 2 is a view used to explain speed control at a power failure time in this invention and showing a power waveform at a power running operation time of the elevator with a time axis as an axis of abscissa.

A power waveform as shown in FIG. 2 (refer (a)) is obtained in the case of full load riding of the elevator and a power running operation such as a ascending direction operation time. Power approximately becomes a total of a power amount depending on the speed of the elevator as shown in FIG. 2 (refer (b)) and a power amount depending on acceleration and deceleration as shown in FIG. 2 (refer (c)). A power curve becomes a peak (51) during acceleration near a highest speed, and becomes a constant voltage (52) at a constant speed, and power is reduced (53) as deceleration is started. In discharging from the secondary battery 12, a dischargeable current value is generally limited by a temperature of the secondary battery 12, a battery voltage at a discharging time, etc. When a sufficient secondary battery 12 is stacked in all cases, the secondary battery 12 becomes expensive. Therefore, it is necessary to limit the discharging from the secondary battery 12 in a specific condition. Further, when the discharging from the secondary battery 12 is limited, the discharging current can be replaced with a three-phase AC current of the three-phase AC power source 1, but a power feeder is large-sized and contract power is increased, etc. so that it becomes expensive. Accordingly, in this invention, the elevator is operated in an allowable power range of the three-phase AC power source 1 when the discharging current of the power accumulating device 11 is limited.

Each of concrete embodiments will next be explained.
Embodiment Mode 1

In this Embodiment mode 1, the speed control circuit 21A has a table T1 in which a limit discharging current is set with respect to a discharging current and a discharging voltage as shown in FIG. 3. The speed control circuit 21A calculates discharging ability power of the power accumulating device 11 by using this table T1, and also calculates a limit power maximum value provided by a sum of this discharging ability power and limit power of the AC power source 1. The speed control circuit 21A then changes speed commands on the basis of the comparison of output power of the inverter 4 and the limit power maximum value.

FIG. 3 will first be explained. FIG. 3 shows an example of a table for limiting the discharging current on the basis of a voltage of the power accumulating device 11 at its discharging time. In this example, the limit power maximum value is made by measuring data of charging and discharging states from the charging-discharging state measuring device 14A and the above table T1. In this table, the present discharging current is a discharging current of the secondary battery 12 outputted from the power accumulating device 11 at present. The discharging voltage of the secondary battery 12 is measured and the limit current of a voltage equal to or greater than a voltage in a voltage column is described in an item of the limit current. For example, there is particularly no limit current when the present discharging current is equal to or greater than A1 ampere and the discharging voltage is equal to or greater than V11 volt. However, when the discharging voltage lies between V11 volt and V12 volt, the discharging current is limited to A12 ampere. When the discharging voltage is equal to or smaller than V12 volt, a table describing discharging inhibition etc. is used. If the table is set in further detail, more preferable results are naturally obtained. Since the speed control is performed in view of these results, a delay is inevitably caused. Therefore, it is necessary to design the table with a margin. It is simple to multiply the present voltage by this limit current and set limit power.

Control of the speed control circuit 21A in this Embodiment Mode 1 will next be explained with reference to a flow chart shown in FIG. 4.

Figure 4:
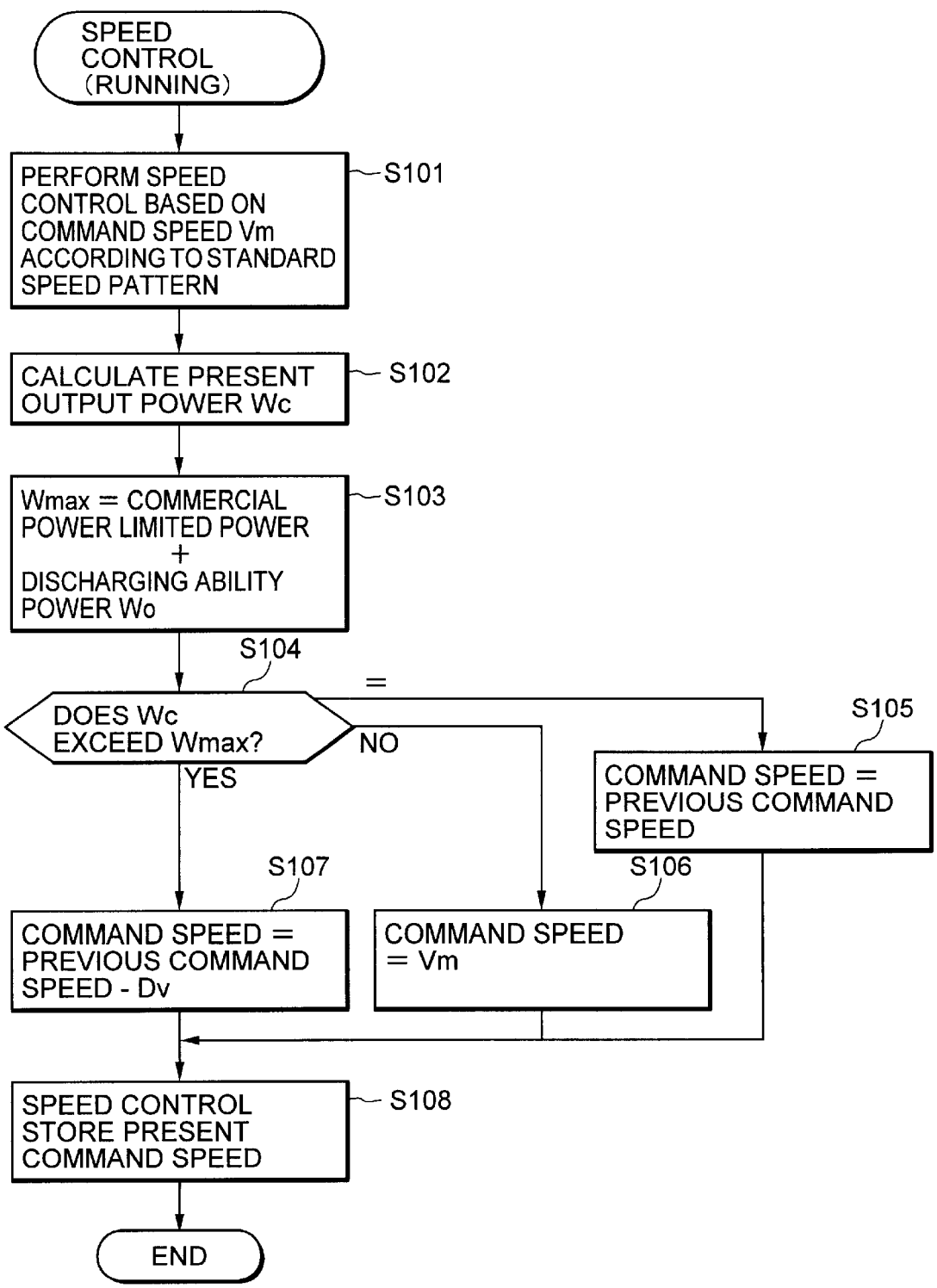
FIG. 4 is a flow chart showing control of the speed control circuit in the Embodiment 1 of this invention.

In FIG. 4, a command speed Vm according to a standard speed pattern is calculated from a running object position, the present command speed, the present position of the elevator, etc. during running of the elevator, and the speed of the elevator is controlled (step S101). The present output power Wc is then calculated on the basis of measuring values of an output current and an output voltage of the inverter 4 from the current measuring instrument 23 and the voltage measuring instrument 24 (step S102).

Thereafter, discharging ability power Wo of the power accumulating device 11 is calculated on the basis of a measuring value from the charging-discharging state measuring device 14A, and predetermined limit power (contract power) of commercial power (three-phase AC power source 1) is added to this discharging ability power so that a limit power maximum value Wmax is calculated (step S103). Namely, measuring values of the discharging current and the discharging voltage from the charging-discharging state measuring device 14A are inputted to the speed control circuit 21A, and the speed control circuit 21A calculates a corresponding limit discharging current from the table T1 shown in FIG. 3. The speed control circuit 21A also calculates the discharging ability power Wo by a product of the calculated limit discharging current and the present discharging voltage, and adds the limit power of commercial power to this calculated discharging ability power Wo and calculates the limit power maximum value Wmax.

The output power Wc of the inverter 4 is then compared with the limit power maximum value Wmax. If the present output power Wc is equal to the limit power maximum value Wmax, the previous command speed is set to a late command speed to maintain the speed at that time (step S104→S105). In contrast to this, if no present output power Wc exceeds the limit power maximum value Wmax, the command speed Vm according to the standard speed pattern is set to the present command speed (step S104→S106). Conversely, when the present output power Wc exceeds the limit power maximum value Wmax, a new command speed is calculated by subtracting a deceleration set value Dv from the previous command speed, and using power is reduced (step S104→S107).

Thus, the speed control is performed on the basis of the calculated command speed, and the calculated command speed is stored to a built-in memory to prepare for the next calculation of the command speed (step S108).

In this case, it is preferable that the limit discharging current of the above table T1 has a margin in consideration of a time delay, etc. At this time, it is not necessary to set a deceleration degree to be increased so much in consideration of rate of change in discharging ability power and ride feeling. Accordingly, it is not necessary so much that an influence due to deceleration is considered in the inverter 4 at a measuring time of output power outputted at present. If it is necessary to consider this influence, no output power outputted at present is used, but it is sufficient to use expected power in constant running from the present speed and load. The elevator is abruptly decelerated when the present output power exceeds the limit power maximum value. However, if processing such as smoothing to the deceleration, etc. is performed in accordance with the present accelerating and decelerating states, a more smooth speed control pattern is obtained.

In the controller of the elevator constructed in this way, while a limit of commercial power is kept, the speed of the elevator can be stably controlled at a discharging time from the power accumulating device 11 in a range in which no excessive burden is imposed on the secondary battery 12. Accordingly, a cheap power accumulating device having a long life can be constructed.

Embodiment mode 2.

Figures 5, 6:
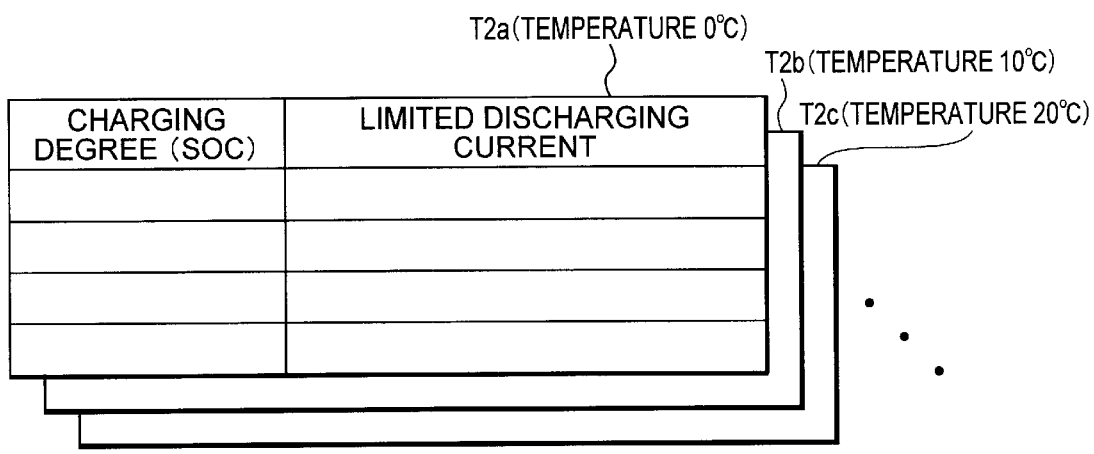
FIG. 5 is an explanatory view of a table in a speed control circuit in an Embodiment 2 of this invention in which a limit discharging current is set with respect to a charging degree.
FIG. 6 is an explanatory view of tables in a speed control circuit in an Embodiment 3 of this invention in which a limit discharging current is set with respect to plural charging degrees in accordance with temperature.

In this Embodiment mode 2, as shown in FIG. 5, the speed control circuit 21A has a table T2 in which a full charging state of the power accumulating device 11 is set to 100% and a limit discharging current is set with respect to a charging degree SOC as a value obtained by normalizing and accumulating a product of a charging-discharging current and a charging-discharging voltage by a capacity. The speed control circuit 21A calculates the limit discharging current from the table T2 on the basis of the charging degree SOC obtained on the basis of measuring values of the discharging current and the discharging voltage from the charging-discharging state measuring device 14A. The speed control circuit 21A also calculates discharging ability power of the power accumulating device 11 from the calculated limit discharging current and the measuring value of the discharging voltage.

Namely, FIG. 5 shows a table of the limit discharging current with respect to the present charging degree SOC of the power accumulating device 11. The present charging degree SOC can be calculated by accumulating charging and discharging currents or power of the secondary battery 12. With respect to this present charging degree SOC, a high discharging current can be generally obtained at a high SOC level. However, no discharging current (power) can be increased as the SOC level is reduced. FIG. 5 shows this situation as a table.

Similar to the Embodiment mode 1, the speed control circuit 21A in this Embodiment mode 2 also calculates a command speed in accordance with the flow chart shown in FIG. 4. Accordingly, while a limit of commercial power is kept, the speed of the elevator can be stably controlled at a discharging time from the power accumulating device 11 in a range in which no excessive burden is imposed on the secondary battery 12. Therefore, a cheap power accumulating device having a long life can be constructed.

Embodiment Mode 3

In this Embodiment mode 3, the speed control circuit 21A has plural tables T2a, T2b, T2c, . . . according to the temperature of the secondary battery 12 of the power accumulating device 11 as shown in FIG. 6. The speed control circuit 21A selects a table according to a temperature measuring value of the charging-discharging state measuring device 14A from the plural tables. Similar to the Embodiment mode 2, the speed control circuit 21A then calculates discharging ability power of the power accumulating device 11, and effects similar to those in the Embodiment modes 1 and 2 can be obtained.

Embodiment Mode 4

Figure 7:
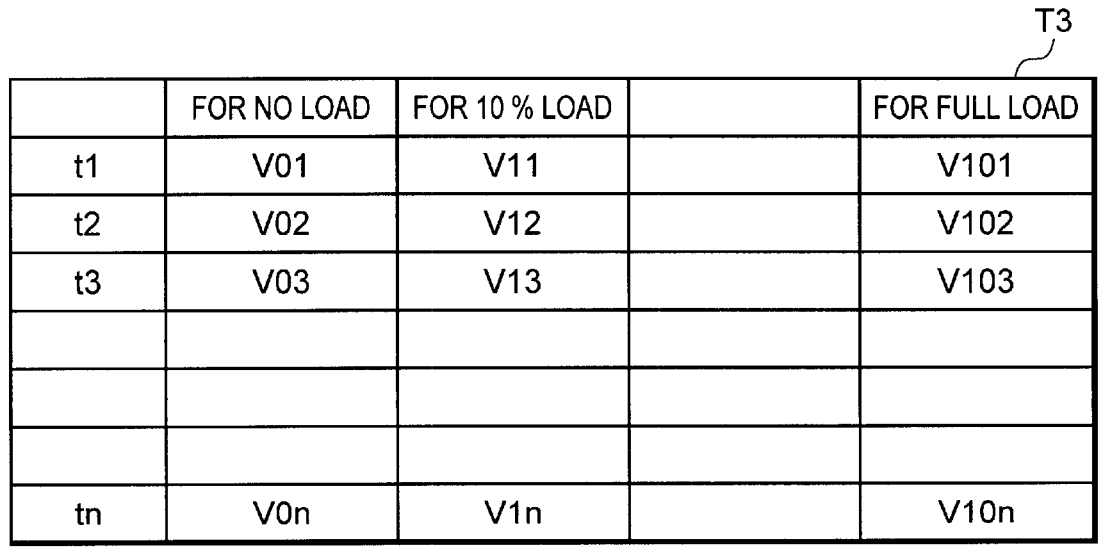
FIG. 7 is an explanatory view of a table in a speed control circuit in an Embodiment 4 of this invention in which a speed pattern according to a load state is set.

In this Embodiment mode 4, as shown in FIG. 7, the speed control circuit 21A has a table T3 in which a speed pattern (e.g., V01, V02, V03, . . . , V0n at a loadless time) according to a load state is set. When it is judged on the basis of a measuring value of the charging-discharging state measuring device 14A that the power accumulating device 11 is broken, the speed control circuit 21A calculates the speed pattern from the above table T3 on the basis of a car load measuring value measured by the car load measuring instrument 25, and generates speed commands according to the calculated speed pattern.

Namely, FIG. 7 illustrates a table showing the speed pattern of speed control in the Embodiment mode 4. This table T3 shows the pattern at an accelerating time, and describes a speed at each of times t1, t2, t3, . . . , tn after departure. Smooth acceleration can be realized by using this table T3. This acceleration table is separately arranged on each of ascending and descending operation sides. A deceleration pattern table corresponding to the above acceleration is used on a deceleration side although this deceleration pattern table is not described here. However, this table generally uses a speed table with respect to the remaining distance until stoppage instead of speed with respect to time. In FIG. 7, items of no load, % load, etc. show patterns with respect to the respective loads.

When a reduction in output of the power accumulating device 11 such as an excessive reduction in charging degree SOC level caused by a certain cause (including breakdown) is known before departure, the elevator can be smoothly operated within restriction power of the three-phase AC power source 1 (commercial power) by operating the elevator in a preset speed pattern. In an operating pattern of the conventional elevator, no elevator has an operating pattern according to a load. Therefore, when the elevator is operated in a restriction power range of the commercial power, for example, a loadless raising operation basically becomes a regenerative operation and no discharging from the power accumulating device 11 is required. In contrast to this, a power running operation is performed in a loadless lowering operation so that consumed power is large. Thus, the elevator can be operated at an optimum speed by setting the speed table in accordance with loads and directions.

Embodiment Mode 5

Figure 8:
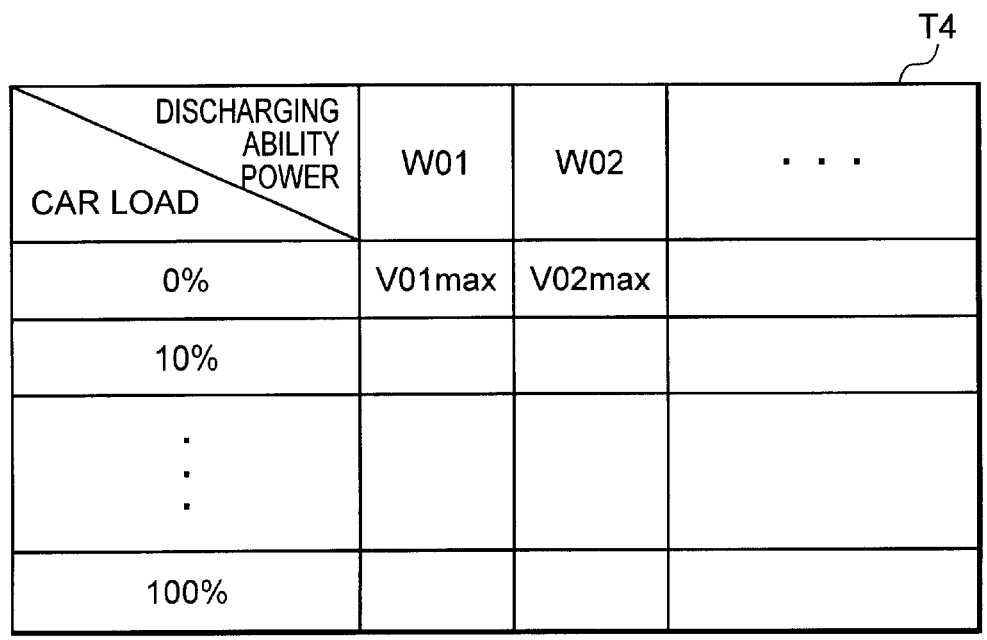
FIG. 8 is an explanatory view of a table in a speed control circuit in an Embodiment 5 of this invention in which a maximum command speed is set with respect to a car load and discharging ability of a power accumulating device.

In this Embodiment mode 5, the speed control circuit 21A, as shown in FIG. 8, has a table T4 in which maximum speed command values $V_{01max}$, $V_{02max}$, . . . are set with respect to a car load and discharging ability power of the power accumulating device 11. The speed control circuit 21A calculates discharging ability powers W01, W02, . . . of the power accumulating device 11 on the basis of a measuring value of the charging-discharging state measuring device 14A. The speed control circuit 21A also calculates the maximum speed command values $V_{01max}$, $V_{02max}$, . . . from the above table T4 on the basis of a car load measuring value measured by the car load measuring instrument 25 and the calculated discharging ability powers. The speed control circuit 21A then changes speed commands on the basis of comparison of the speed commands and the maximum speed commands.

Figure 9:
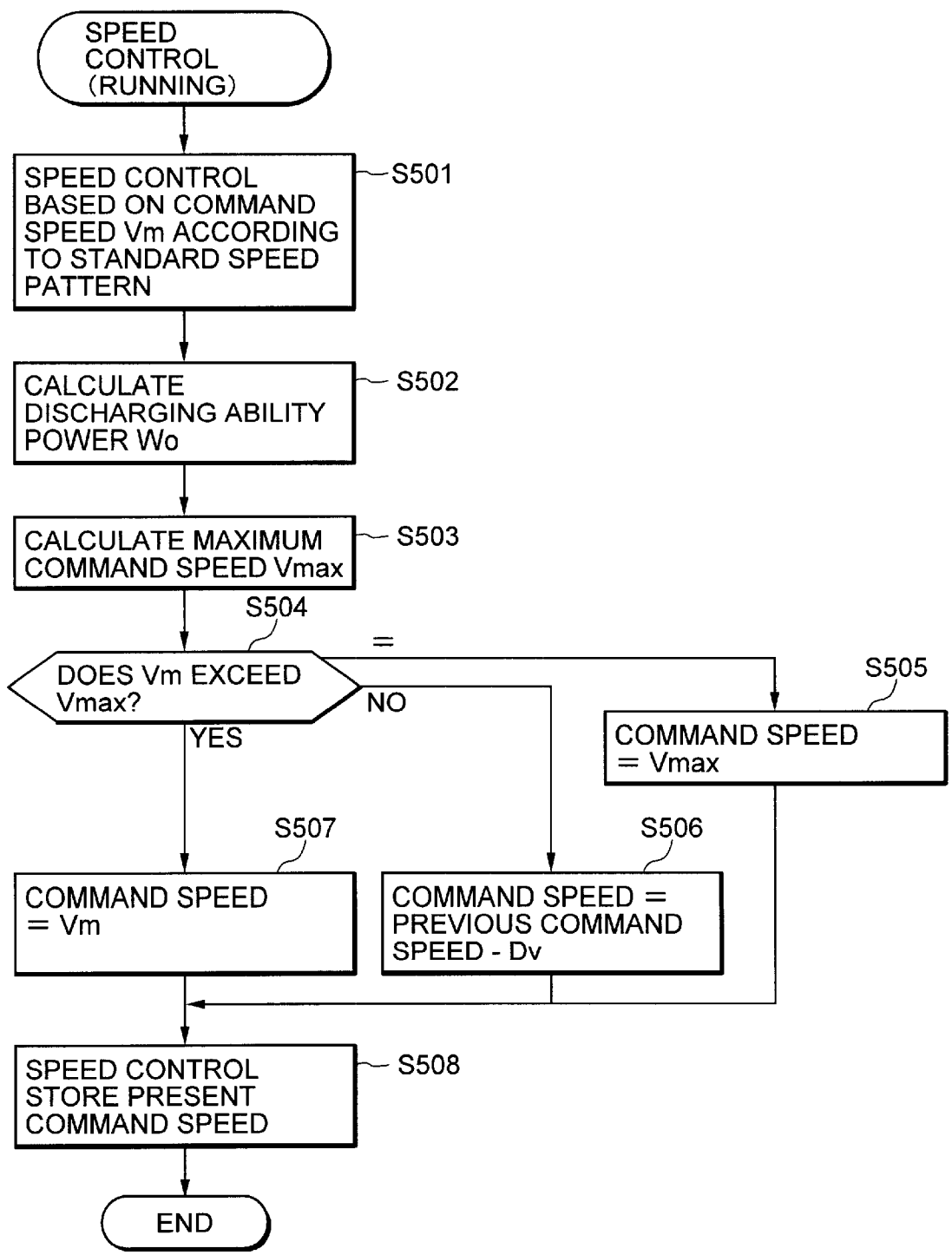
FIG. 9 is a flow chart showing control of the speed control circuit in the Embodiment 5 of this invention.

Control of the speed control circuit 21A in this Embodiment mode 5 will next be explained with reference to a flow chart shown in FIG. 9.

Speed control of the inverter 4 is first performed on the basis of a command speed Vm according to a standard speed pattern (step S501). Discharging ability power Wo of the power accumulating device 11 is then calculated on the basis of a measuring value from the charging-discharging state measuring device 14A (step S502).

Thereafter, a corresponding maximum command speed Vmax is calculated from the table T4 shown in FIG. 8 on the basis of a car load measuring value of the car load measuring instrument 25 and the discharging ability power Wo (step S503). Further, the command speed Vm based on the standard speed pattern and the maximum command speed Vmax are compared with each other (step S504).

If the present command speed Vm is equal to the maximum command speed Vmax, the maximum command speed Vmax is set to a command speed (step S504→S505). In contrast to this, when the present command speed Vm does not exceed the maximum command speed Vmax, a new command speed is calculated by subtracting a deceleration set value Dv from the previous command speed to decelerate the speed, and using power is reduced (step S504→S506). Conversely, if the present command speed Vm exceeds the maximum command speed Vmax, the command speed Vm based on the standard speed pattern is set to a command speed (step S504→S507).

Thus, speed control is performed on the basis of the calculated command speed, and the calculated command speed is stored to a built-in memory to prepare for the next calculation of the command speed (step S508).

Accordingly, in accordance with the above Embodiment mode 5, while a limit of commercial power is kept, the speed of the elevator can be stably controlled at a discharging time from the power accumulating device 11 in a range in which no excessive burden is imposed on the secondary battery 12. Therefore, a cheap power accumulating device having a long life can be constructed.

Embodiment Mode 6

In this Embodiment mode 6, the speed control circuit 21A has plural, as shown in FIG. 10, tables T5 in which a command speed value of the elevator is stored every timer interruption of each speed control. The plural tables T5 are separately arranged every discharging ability power of the power accumulating device and every load of the elevator. For example, when ten tables are arranged every discharging ability power of the power accumulating device and ten tables are arranged in each load every each of these ten tables of the discharging ability power, a total number of tables becomes 100. Further, as shown in FIG. 11, the speed control circuit 21A has a table T6 in which a command speed according to the remaining distance is set.

Namely, in this Embodiment mode 6, the speed control circuit 21A first calculates the command speed according to the remaining distance on the basis of the table T6 as shown in FIG. 11. Further, the speed control circuit 21A calculates the discharging ability power of the power accumulating device on the basis of a measuring value of the charging-discharging state measuring device. The speed control circuit 21A then selects a table T5 as shown in FIG. 10 in accordance with both data of the discharging ability power and a car load measuring value measured by the car load measuring instrument 25 on the basis of this car load measuring value. The speed control circuit 21A calculates the command speed from the selected table every control timer interruption. At a timer interruption time, for example, the speed control circuit 21A calculates v1 as a command speed at the timer interruption time just after start, and calculates v2 as a command speed at the next timer interruption time.

Control of the speed control circuit 21A in this Embodiment mode 6 will next be explained with reference to a flow chart shown in FIG. 12.

Figure 12:
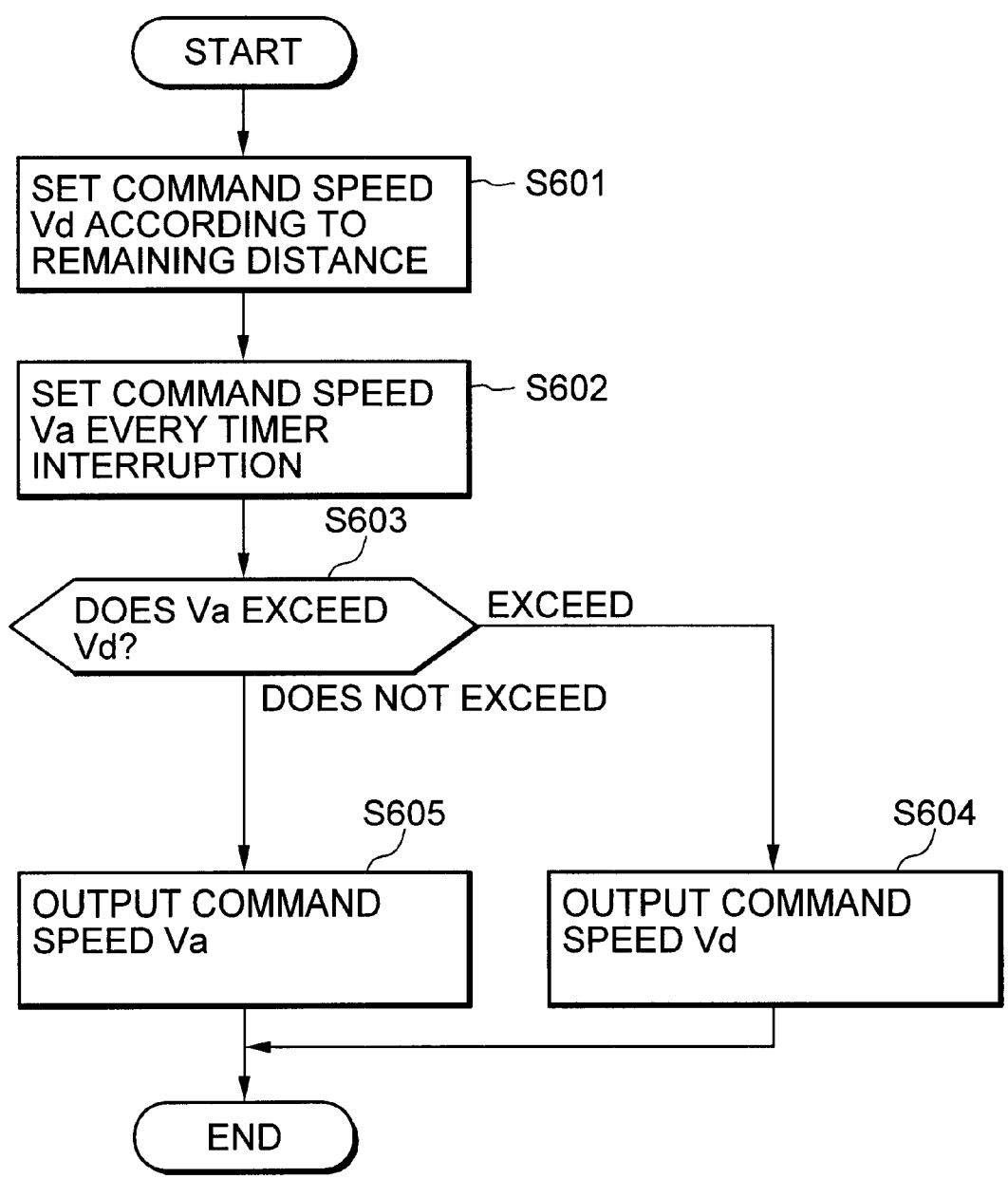
FIG. 12 is a flow chart showing control of the speed control circuit in the Embodiment 6 of this invention.

The flow chart shown in FIG. 12 is started every timer interruption. First, a command speed is calculated in accordance with the remaining distance until an object floor with reference to the table T6. For example, if the remaining distance until the object floor is equal to or greater than d1, the command speed Vd according to the remaining distance is set to vd1. If the remaining distance until the object floor is equal to or smaller than d1 and exceeds d2 (d1>d2 and command speeds are arranged in a long order of the remaining distance in the table), the command speed Vd according to the remaining distance is set to vd2. Hereinafter, the command speed Vd according to the remaining distance is set in accordance with this table T6 (step S601).

A command speed Va according to the number of timer interruption times is next set. Namely, since there is periodically a timer interruption, a table T5 shown in FIG. 10 is selected in accordance with both data of the discharging ability power and the car load measuring value every time from start. The command speed Va according to the number of timer interruption times is set from the selected table T5 every control timer interruption (step S602). Since the speed is set to a highest speed in a final table T5, Va=Vmax is set after that.

Next, the command speed Va every timer interruption is compared with the command speed Vd according to the remaining distance. If the command speed Va every timer interruption exceeds the command speed vd according to the remaining distance, the command speed is set to Vd (step S603→S604). In contrast to this, if no command speed va every timer interruption exceeds the command speed Vd according to the remaining distance, the command speed is set to Va (step S603→S605). Namely, the speed of the elevator is accelerated in accordance with the table T5 shown in FIG. 10 at an accelerating time, and is decelerated in accordance with the table T6 shown in FIG. 11 at a decelerating time. Thus, the speed control can be smoothly performed until an object floor.

As mentioned above, in accordance with this invention, it is possible to construct an elevator which can perform stable speed control by using a cheap power accumulating device of a low capacity even at a discharging control time, and has the power accumulating device having a long battery life without reducing energy saving effects.

What is claimed is:

1. An elevator speed controller responsive to dual electrical power sources, the speed controller comprising:

a converter for rectifying AC power from an AC power source to produce DC power, the AC power source supplying AC power only up to a power limit;

an inverter for converting the DC power output from said converter to AC power having a variable voltage and a variable frequency to drive an electric motor for operating an elevator;

DC buses connecting said converter to said inverter;

a power accumulating device connected said DC buses, charging by accumulating DC power from the DC buses during a regenerative power operation of the elevator, and discharging by supplying the accumulated DC power to the DC buses during operation of the elevator;

a charging-discharging control device for controlling charging and discharging of said power accumulating device with respect to said DC buses;

charging-discharging state measuring means for measuring at least one of temperature, charging and discharging currents, and charging and discharging voltages of said power accumulating device;

current detecting means for detecting an output current of said inverter;

voltage detecting means for detecting an output voltage of said inverter;

speed detecting means for detecting speed of the elevator; and speed control means for controlling operation of said inverter to control the speed of the elevator, based on speed commands of the elevator and the speed detected by said speed detecting means, said speed control means calculating output power of said inverter based on the output current detected by said current detecting means and the output voltage detected by said voltage detecting means, calculating discharging ability of said power accumulating device based on a value measured by said charging-discharging state measuring means, calculating a maximum power limit as a sum of the discharge ability of the power accumulating device and the power limit of the AC power source, and changing speed commands if the AC power output of said inverter exceeds the maximum power limit.

2. The elevator speed controller according to claim 1, wherein said speed control means includes a memory storing a table including a limited discharging current set with respect to a discharging current and a discharging voltage, calculates the limited discharging current from the table on the discharging current and the discharging voltage measured by said charging-discharging state measuring means, and calculates the discharging ability of said power accumulating device from the limited discharging current calculated and the discharging voltage measured.

3. The elevator speed controller according to claim 1, wherein said speed control means includes a memory for storing a table including a limited discharging current set with respect to a charging degree obtained by normalizing and accumulating a product of a charging-discharging current and a charging-discharging voltage, with discharging ability of power accumulating device when fully charged set as 100%, wherein the limited discharging current is calculated from the table based on the charging degree, the discharging current and the discharging voltage measured by said charging-discharging state measuring means, and the discharging ability of said power accumulating device is calculated from the limited discharging current calculated and the discharging voltage measured.

4. The elevator speed controller according to claim 3, wherein said speed control means includes plural tables according to the temperature of said power accumulating device, and selects a table according to the temperature measured by said charging-discharging state measuring means.

5. The elevator speed controller according to claim 1, including car load measuring means for measuring the load in the elevator, and wherein said speed control means includes a table having a speed pattern set according to the load, and calculates the speed pattern from the table based on the load measured by said car load measuring means, and generates speed commands according to the speed pattern calculated, when, based on a measured value provided by said charging-discharging state measuring means, said power accumulating device fails.

6. The elevator speed controller according to claim 1, including car load measuring means for measuring the load in the elevator, and wherein said speed control means includes a table with a maximum speed command set with respect to the load of the elevator and the discharging ability of said power accumulating device, and calculates the discharging ability of said power accumulating device based on a measured value produced by said charging-discharging state measuring means, and calculates maximum speed commands from the table based on the load measured by said car load measuring means and the discharging ability calculated, and changes speed commands based on comparison of the speed commands and the maximum speed commands.

7. The elevator speed controller according to claim 5, wherein said speed control means has plural speed pattern tables corresponding to car loads and the discharging ability of said power accumulating device, and calculates the discharging ability of said power accumulating device based on a measured value provided by said charging-discharging state measuring means, and selects a speed pattern from the tables, based on the load measured by said car load measuring means, and controls speed according to the speed pattern selected.

* * * * *